UNITED STATES PATENT OFFICE.

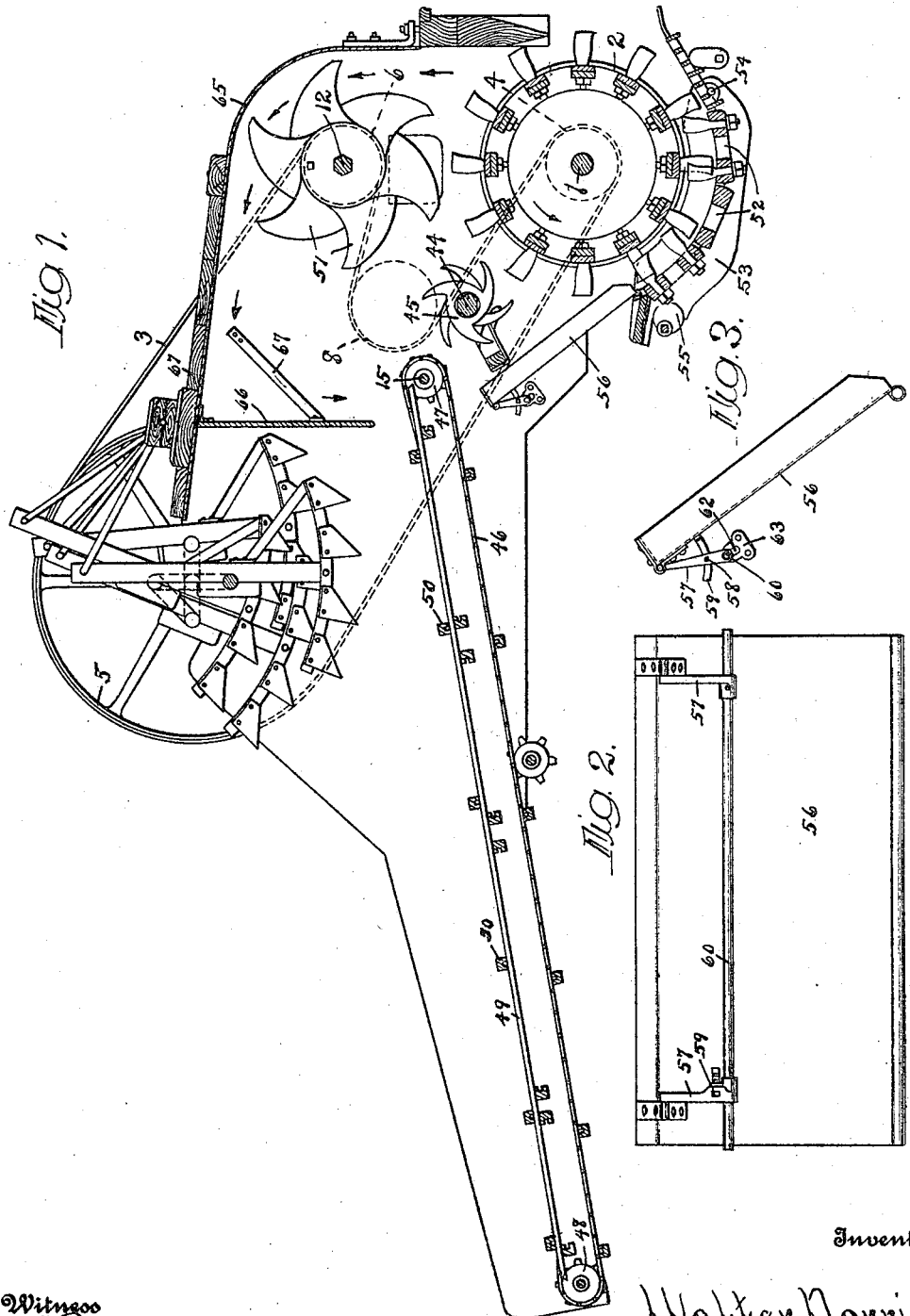

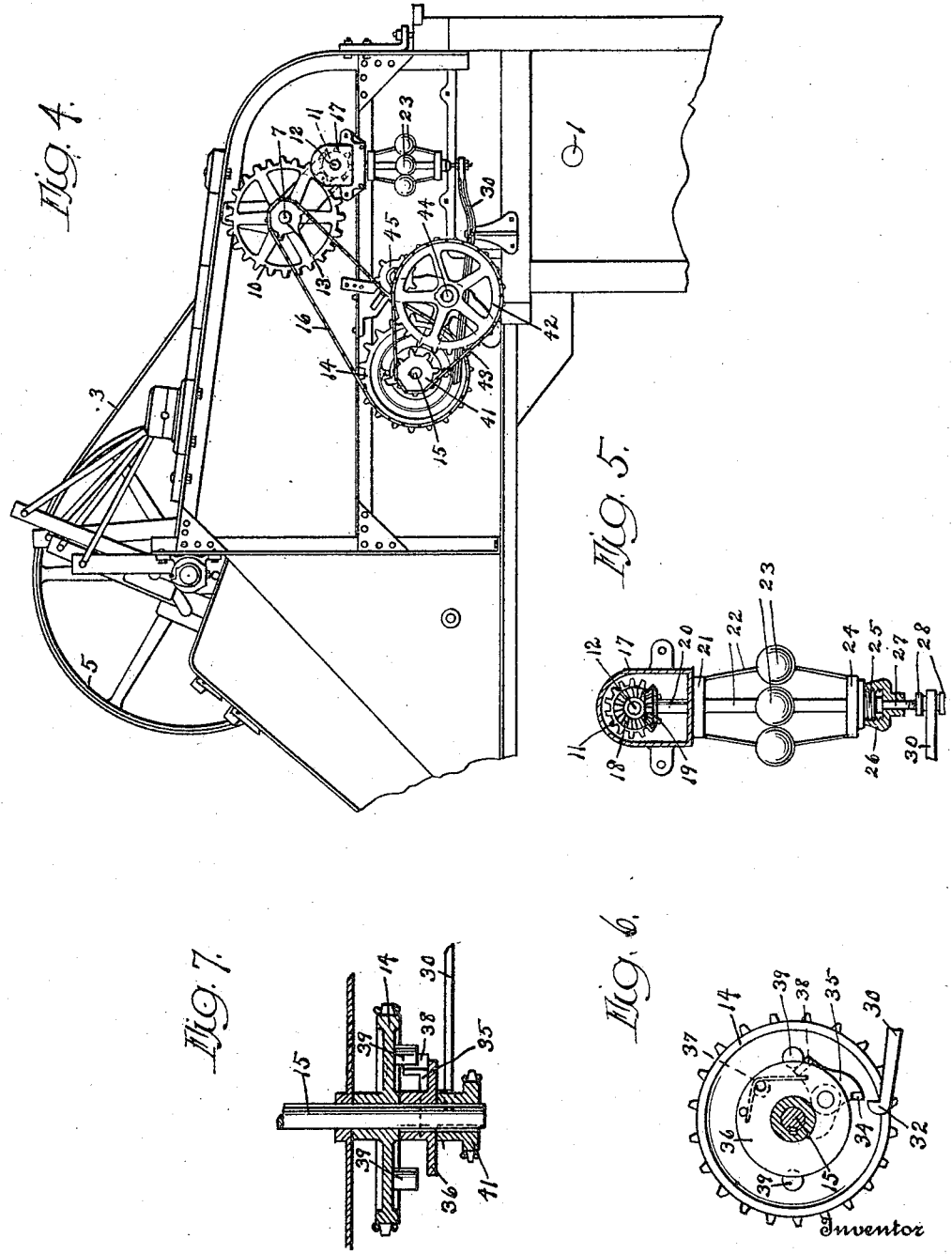

WALTER NORRIS, OF PORT HURON, MICHIGAN, ASSIGNOR TO PORT HURON ENGINE AND THRESHER COMPANY, OF PORT HURON, MICHIGAN, A CORPORATION OF MICHIGAN.

FEEDER FOR THRESHING-MACHINES.

1,256,506.  Specification of Letters Patent.  Patented Feb. 12, 1918.

Application filed March 9, 1916. Serial No. 83,001.

*To all whom it may concern:*

Be it known that I, WALTER NORRIS, a citizen of the United States, and residing at Port Huron, in the county of St. Clair and State of Michigan, have invented a new and Improved Feeder for Threshing-Machines, of which the following is a specification.

This invention relates to feeding mechanisms for threshing machines and its object is to produce a device in which the shaft carrying the feeder drives both the carrier and the governor; in which the housing is curved over the feeder; in which the feeder shaft is not in advance of a vertical plane passing through the thresher-cylinder shaft; in which both ends of the feed board may be adjusted simultaneously; and in which a deflector is mounted in front of the revoluble feeder to prevent grains from being thrown out of the machine.

This invention consists in the details of construction illustrated in the accompanying drawings and particularly pointed out in the claim.

In the accompanying drawings, Figure 1 is a vertical longitudinal section of a threshing machine having this improved feeding mechanism. Fig. 2 is a rear elevation of the feed board. Fig. 3 is an end elevation of the feed board. Fig. 4 is a side elevation of the machine. Fig. 5 is an elevation of the governor. Fig. 6 is an elevation and Fig. 7 a horizontal section of the clutch on the carrier drive-shaft.

Similar reference characters refer to like parts throughout the several views.

Mounted in the body of the threshing machine is a shaft 1 on which the thresher-cylinder 2 is mounted. Any desired means may be employed to drive this shaft and all the other movable devices are driven from this shaft. The usual method of employing a belt 3 which passes around a pulley 4 on this shaft 1, around the pulley 5 of the cutters, around the pulley 6 on the feeder-shaft 12 and around a tightener pulley 8 is followed in this case, and as this particular construction is old, it is shown conventionally.

As the shaft 1 of the thresher-cylinder drives the feeder-shaft, the rate of feed can never exceed a predetermined ratio relative to the speed of the threshing-cylinder. It is therefore desirable in high speed threshing machines to drive the carrier and retarder from the feed-shaft so that, should any slip of the belt 3 occur, the carrier will slow up. It is further desirable that the carrier and retarder should be driven by the feeder-shaft, so that, in the event an overload of grain passes into the machine, the feeder will be slowed down on account of being overloaded and should its revolutions be reduced below a predetermined speed, the governor which is driven by the feeder-shaft will disconnect the carrier and thus relieve the threshing mechanism. Driving the carrier and governor from the feeder-shaft gives a more uniform feed of grain to the threshing cylinder and therefore results in greater efficiency.

This driving mechanism is illustrated in Figs. 4 to 7 inclusive. Secured to the feeder-shaft 12 is a pinion 11 that meshes with a gear 10 loose on the countershaft 7, which gear connects to the sprocket gear 13 that connects to the large sprocket gear 14, loose on the head-shaft 15 of the carrier by means of the sprocket chain 16.

The end of the feeder-shaft 12 is mounted in a casing 17 and carries the bevel gear 18 which is connected to the pinion 11, and this bevel gear meshes with a bevel gear 19 on the vertical shaft 20. This shaft carries a disk 21 to which are attached the flat springs 22 carrying weights 23. These springs connect to the disk 24 having a hub 25 onto which a cup 26 is screwed. A stem 27 is carried by this cup and has collars 28 that are on the upper and lower sides of a lever 30. When the weights 23 swing out, the adjacent end of the lever 30 swings up and the hook 32 on its opposite end swings down. But when the speed of the feeder-shaft falls below a predetermined rate, this hook 32 will move up into the path of a finger 34 on the dog 35 pivoted on the disk 36 which is secured to the head-shaft of the carrier and disconnect the sprocket wheel 14 from the shaft 15.

As stated before, the sprocket wheel 14 is loose on the head-shaft 15 of the grain carrier. The spring 37 carried by the disk 36 normally holds the finger 38 on the pawl 35 in the path of the pins 39 that project from the sprocket wheel 14, and this wheel therefore normally drives the shaft 15 through the pawl 35 and disk 36. But when the speed of the governor falls sufficiently to permit the hook 32 to move up into the path of the finger 34, the finger 38 will be swung in out of the path of the pins 39, and the carrier-shaft 15 will be disconnected from the feeder-shaft 12, and remain disconnected until the feeder-shaft shall have attained sufficient speed. A sprocket wheel 41 secured on this shaft 15 connects to the sprocket wheel 42 secured on the shaft 44 of the retarder by means of the chain 43. An idler 45 may be employed to keep tight the chain 16, and it will be noticed that all the operating shafts in this machine run in the same direction.

The rotary grain-retarder 45 on the shaft 44 is of any desired construction as is also the carrier-belt 46 that runs on the wheels 47 and 48, being supported by the frame 49 and having cross bars 50. The feeder-shaft 12 is preferably quite far back in the threshing chamber so as to permit the rotary grain-retarder being placed close up to the threshing cylinder. It also permits the threshing cylinder being placed high up and near the delivery end of the grain carrier. The feeders 51 may be of any desired construction.

The frames 53 of the concaves 52 are mounted on the pins 54 at their rear ends and on the cams 55 at their front ends so that they can be adjusted at will. The feed-board 56 is pivoted at the front ends of these frames 53 and has arms 57 pivoted to its upper edge. One of these arms carries a screw 58 that locks the arm to the segment 59 extending from the feed-board. These arms 57 carry the shaft 60 that has its ends mounted in slots 62 in the stationary brackets 63. By swinging the arms 57 toward and from the feed-board, the position of this board relative to the retarder and threshing cylinder may be changed to meet the requirements of different conditions of grain.

It will be noticed that the rear end of the housing is curved at 65 with substantially the shaft 12 as a center. As the feeder and the threshing drum revolve in the same direction, air circulates in the direction of the arrows in Fig. 1, and such straw and grains as are drawn up by this current or are thrown up by the moving parts are carried over against the deflector 66 which is a board hinged to the upper part 67 of the housing. The current of air descends and the straw and grain carried thereby falls on the carrier. Where the rear end of the housing is vertical for its entire height, grains are often thrown out of the machine and lost. The forward movement of the board 66 is limited by the strap 67.

I claim:—

In a threshing machine, the combination of a carrier, a threshing cylinder, a rotary feeder mounted above the threshing cylinder, a housing for said mechanism extending up from above the threshing cylinder and then curving forward around the axis of the feeder to form a segment of a cylinder, a flat top for said housing inclining downwardly to said curved portion which merges into it, and a yielding imperforate deflector extending down from said top above the discharge end of the carrier to deflect downwardly the current of air from the threshing cylinder and thereby prevent the passage of grain from the machine.

WALTER NORRIS.